June 10, 1930.  F. M. CASE  1,762,158
LUBRICATING CAP NUT FOR FISHING REELS
Original Filed June 2, 1922
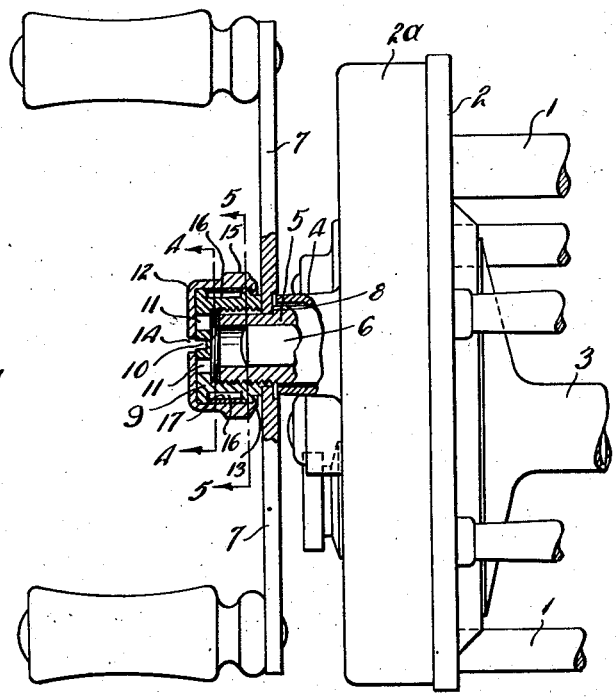
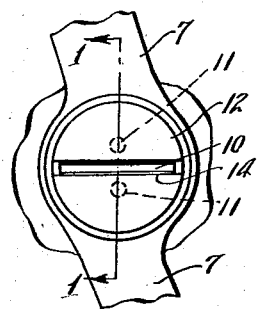
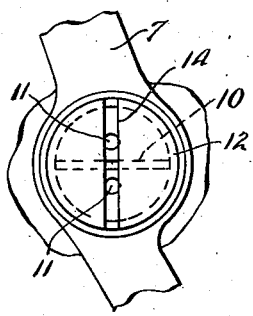
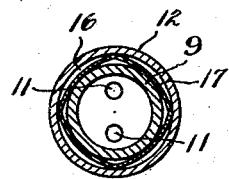
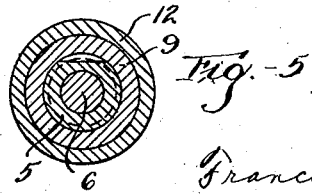
Inventor
Francis M. Case
By Brockett Hyde & Milburn
Attorneys Patented June 10, 1930

1,762,158

UNITED STATES PATENT OFFICE

FRANCIS M. CASE, OF CLEVELAND HEIGHTS, OHIO, ASSIGNOR TO THE ENTERPRISE MANUFACTURING COMPANY, OF AKRON, OHIO, A CORPORATION OF OHIO

LUBRICATING CAP NUT FOR FISHING REELS

Continuation of original application filed June 2, 1922, Serial No. 565,377, now Patent No. 1,637,437. This application filed June 26, 1924. Serial No. 722,525.

This invention relates to fishing reels and more particularly, to a securing device, such as a cap nut, for a working part of the reel.

The object of the invention is to provide an improved securing device of the character stated which is properly equipped to take care of its usual securing function and at the same time serves as a lubricating device, being provided for this purpose with means for opening and closing a lubricating opening and also controlling access to a tool receiving means.

A further object of the invention is to provide a device of this kind which is readily secured to its seat by the fingers of the operator and is then capable of further operation by a suitable tool for firm attachment.

Further objects of the invention are in part obvious and in part will appear more in detail hereinafter.

This application is a continuation as to common subject matter of my prior application for fishing reels, filed June 2, 1922, Serial No. 565,377.

Referring to the drawings, Fig. 1 illustrates an elevation, partly in section on the line 1—1, Fig. 2, of one end of a fishing reel embodying the invention; Fig. 2 is a detail end view from the left in Fig. 1; Fig. 3 is a similar view showing the cover casing rotated to the lubricating position; Fig. 4 is a cross section on the line 4—4, Fig. 1; and Fig. 5 is a similar cross section on the line 5—5, Fig. 1.

The present invention is capable of application to many if not all types of fishing reels and to any working part of the reel which is secured or held in place or is enclosed or covered by a securing device, or to which some other part is connected and through which device it is desirable to supply lubricant to inner working parts or surfaces. Examples of such devices are the threaded caps which cover the end bearings of the rotating spool shaft and the threaded cap nut which secures the operating handle to the gear operating shaft. For convenience, the drawings illustrate the invention applied to an operating handle securing device.

The fishing reel illustrated comprises the usual frame including posts or pillars 1 connecting end caps or heads 2 between which rotates a spool 3. The end cap or head shown has attached thereto a gear box or casing 2ª provided with a hollow stud 4, through which extends the stub shaft 5 of the first operating gear (not shown), said hollow shaft being rotatable upon a stud 6.

The driving means for shaft 5 is the usual double handle 7 having a central opening so that it can be sleeved over the outer threaded end of shaft 5 to seat against shoulders 8 at the ends of opposite flattened portions of said shaft and in which position the operating handle is held by the securing device now to be described.

Said device is illustrated in the form of a hollow cap nut 9, threaded on shaft 5 against the handle 7 and provided in its outer or end face with suitable means for attachment thereto of a driving or rotating tool, such as the transverse slot 10 to receive a screw driver. Said nut is also provided with lubricating openings or passages 11, two of which are shown located one on each side of the screw driver slot 10 and leading to the hollow space within the nut. Lubricant supplied through one of said openings thereby flows to the bearing surfaces between shaft 5 and stud 6, the lubricant entering through one opening while air escapes through the other.

To enable the lubricant openings to be closed, when desired, the cap nut is enclosed within or covered by a hollow thimble or casing 12 permanently attached to the nut, such as by beading a portion 13 of the thimble metal around a shoulder of the nut. Said thimble in its outer or end face is provided with a diametrically extending slot 14, while its outer cylindrical surface is suitably formed for convenient rotation by the fingers, such as by being provided with a knurled annular rib 15.

Means is provided for frictionally and yieldably holding the thimble or casing in whatever position it may be turned to open the nut, the drawings showing for this purpose an annular groove 16 in the nut in which is located a spring member 17, consisting of a strip of spring material bent to substantially square form and placed under tension in the channel 16 between the nut and the casing and tending to prevent relative rotation therebetween.

Fig. 2 shows the nut and the thimble casing with their screw-driver slots in registering relation, in which position a screw driver may be engaged with the slot in the nut to tighten or loosen the same. Fig. 3 illustrates the nut and thimble rotated 90°, with their slots in cross relation, in which position access may be gained to the lubricating openings 11 through the screw driver slot in the thimble casing, and enabling lubricant to be supplied to the bearing. In this position, however, the screw driver may not be applied for positively driving or turning the nut. This is the position the parts occupy during lubrication, while Fig. 2 illustrates the position of the parts when the reel is in use. If the operating handle is removed for any reason the nut is loosened with the screw driver as before stated, and may then be quickly unthreaded by the operator's fingers, the turning effect of which is applied to the knurled thimble and is communicated to the nut due to the friction between the nut and thimble. Likewise in re-applying the parts the nut can be quickly secured down upon the shaft preparatory to tightening it with a screw driver. In completing this operation the two screw driver slots are brought into registry for the final tightening operation, leaving the parts in the position shown in Fig. 2 with the oil holes covered, so that the operator is not likely to use the reel with the oil openings exposed.

What I claim is:

In a fishing reel, an externally threaded tubular element, an internally threaded tubular body member mounted upon said element and having a closed outer end provided with a diametrically disposed screw driver slot and with a through lubricating opening at one side of said slot, a rotatably adjustable cover for the closed end portion of said body member and having a tubular side portion and a closed outer end, said cover side portion having an interlocking connection with said tubular body member which permits relative rotary movement therebetween but prevents relative endwise or longitudinal movement therebetween, said cover closed end having a diametrically disposed slotted opening theretrough adapted when said cover is in one position of adjustment to expose said screw driver slot and when said cover is in another position of adjustment to expose said lubricating opening, and means located between the side portion of said cover and said tubular body member and engaging both thereof for maintaining said cover in any adjusted position.

In testimony whereof I hereby affix my signature.

FRANCIS M. CASE.